United States Patent
Selvaganapathy et al.

(10) Patent No.: US 12,506,577 B2
(45) Date of Patent: Dec. 23, 2025

(54) ENHANCED USE OF DEACTIVATED SECONDARY CELL GROUP IN DUAL-RX/DUAL-TX MUSIM OPERATION

(71) Applicant: Nokia Technologies Oy, Espoo (FI)

(72) Inventors: Srinivasan Selvaganapathy, Bangalore (IN); Faranaz Sabouri-Sichani, Aalborg (DK); Laura Luque Sanchez, Aalborg (DK); Janne Veikko Kaasalainen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 341 days.

(21) Appl. No.: 18/455,168

(22) Filed: Aug. 24, 2023

(65) Prior Publication Data

US 2024/0113824 A1  Apr. 4, 2024

(30) Foreign Application Priority Data

Sep. 29, 2022  (IN) .............................. 202241055936

(51) Int. Cl.
| | |
|---|---|
| H04W 72/04 | (2023.01) |
| H04L 5/00 | (2006.01) |
| H04L 27/00 | (2006.01) |
| H04W 40/00 | (2009.01) |
| H04W 76/00 | (2018.01) |
| H04W 88/08 | (2009.01) |

(52) U.S. Cl.
CPC ........ *H04L 5/0048* (2013.01); *H04L 27/0006* (2013.01); *H04W 40/005* (2013.01)

(58) Field of Classification Search
None
See application file for complete search history.

(56) References Cited

U.S. PATENT DOCUMENTS

| | | | |
|---|---|---|---|
| 12,069,695 B2* | 8/2024 | Palle Venkata ... | H04W 74/0833 |
| 2023/0276296 A1* | 8/2023 | Kim ........................ | H04L 5/001 |
| 2025/0071632 A1* | 2/2025 | Chen ................. | H04W 36/0069 |

FOREIGN PATENT DOCUMENTS

OA  21612 A  * 11/2024

OTHER PUBLICATIONS

"3rd Generation Partnership Project; Technical Specification Group Radio Access Network; NR; Radio Resource Control (RRC) protocol specification (Release 17)", 3GPP TS 38.331, V17.0.0, Mar. 2022, pp. 1-1221.

(Continued)

*Primary Examiner* — Maharishi V Khirodhar
(74) *Attorney, Agent, or Firm* — Nokia Technologies Oy

(57) ABSTRACT

Techniques of operating a MUSIM include providing information by a UE connected to a secondary node within a first network having a secondary cell group in a deactivated state to a second network to which the UE is connected, the information indicating that the UE is to be connected to a secondary cell group of a secondary node in the deactivated state. Specifically, the UE may send to the second network a first gap request requesting a first set of schedule gaps for performing measurements relating to the secondary cell group of the first network, the secondary cell group being in the deactivated state.

20 Claims, 6 Drawing Sheets

(56) References Cited

OTHER PUBLICATIONS

"3rd Generation Partnership Project; Technical Specification Group Radio Access Network; NR; NR and NG-RAN Overall Description; Stage 2 (Release 17)", 3GPP TS 38.300, V17.0.0, Mar. 2022, pp. 1-204.

"Revised WID: Dual Transmission/Reception (Tx/Rx) Multi-SIM for NR", 3GPP TSG RAN Meeting #95e, RP-220955, Agenda: 9.3.2.3, vivo, Mar. 17-23, 2022, 5 pages.

"LG A290 Triple SIM", LG, Retrieved on Oct. 17, 2022, Webpage available at : https://www.lg.com/ae/mobile-phones/lg-A290.

"Revised SID: Study on system enablers for multi-SIM devices", TSG SA Meeting #SP-83, SP-190248, Agenda: 178.19, SA WG2, Mar. 20-22, 2019, 4 pages.

"New WID: Support for Multi-SIM devices in Rel-17", 3GPP TSG RAN Meeting #86, RP-193263, Agenda: 9.1.2, vivo, Dec. 9-12, 2019, 5 pages.

"Corrections on TS 37.340 for DCCA enhancement", 3GPP TSG-RAN WG2 Meeting #118-e, R2-2206704, ZTE Corporation, May 9-20, 2022, 59 pages.

"Msc-generator", Sourceforge, Retrieved on Sep. 6, 2023, Webpage available at : https://sourceforge.net/projects/msc-generator/.

* cited by examiner

ENHANCED USE OF DEACTIVATED SECONDARY CELL GROUP IN DUAL-RX/DUAL-TX MUSIM OPERATION

RELATED APPLICATION

This application claims priority to, and the benefit of, Indian provisional application no. 202241055936, filed on Sep. 29, 2022, the contents of which is hereby incorporated by reference in its entirety.

TECHNICAL FIELD

This description relates to telecommunications systems.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipment (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes releasing, by a user device having a plurality of subscriber modules and being in a dual connection with a first cell group and a second cell group of a first network, a connection of the second cell group of the first network to enter a deactivated state for the second cell group of the first network; establishing a connection with a second network; transmitting an indication to at least one of the first and second networks indicating that an addition of a second cell group connection is only possible in deactivated state; transmitting a first gap request to the second network, the first gap request requesting a first set of scheduled gaps for performing measurements relating to the second cell group of the first network, the second cell group being in the deactivated state; adding a second cell group in the deactivated state to the connection with the second network; and transmitting a second gap request to the first network, the second gap request requesting a second set of scheduled gaps for performing measurements relating to the second cell group of the second network, the second cell group being in the deactivated state.

According to an example implementation, an apparatus includes at least one processor and at least one memory including computer program code, the at least one memory and the computer program code configured to, with the at least one processor, cause the apparatus at least to release, by a user device having a plurality of subscriber modules and being in a dual connection with a first cell group and a second cell group of a first network, a connection of the second cell group of the first network to enter a deactivated state for the second cell group of the first network; establish a connection with a second network; transmit an indication to at least one of the first and second networks indicating that an addition of a second cell group connection is only possible in deactivated state; transmit a first gap request to the second network, the first gap request requesting a first set of scheduled gaps for performing measurements relating to the second cell group of the first network, the second cell group being in the deactivated state; adding a second cell group in the deactivated state to the connection with the second network; and transmit a second gap request to the first network, the second gap request requesting a second set of scheduled gaps for performing measurements relating to the second cell group of the second network, the second cell group being in the deactivated state.

According to an example implementation, a computer program product includes a computer-readable storage medium and storing executable code that, when executed by at least one data processing apparatus, is configured to cause the at least one data processing apparatus to release, by a user device having a plurality of subscriber modules and being in a dual connection with a first cell group and a second cell group of a first network, a connection of the second cell group of the first network to enter a deactivated state for the second cell group of the first network; establish a connection with a second network; transmit an indication to at least one of the first and second networks indicating that an addition of a second cell group connection is only possible in deactivated state; transmit a first gap request to the second network, the first gap request requesting a first set of scheduled gaps for performing measurements relating to the second cell group of the first network, the second cell group being in the deactivated state; adding a second cell group in the deactivated state to the connection with the second network; and transmit a second gap request to the first network, the second gap request requesting a second set of scheduled gaps for performing measurements relating to the second cell group of the second network, the second cell group being in the deactivated state.

The details of one or more examples of implementations are set forth in the accompanying drawings and the description below. Other features will be apparent from the description and drawings, and from the claims.

DETAILED DESCRIPTION

The principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Figure 1:
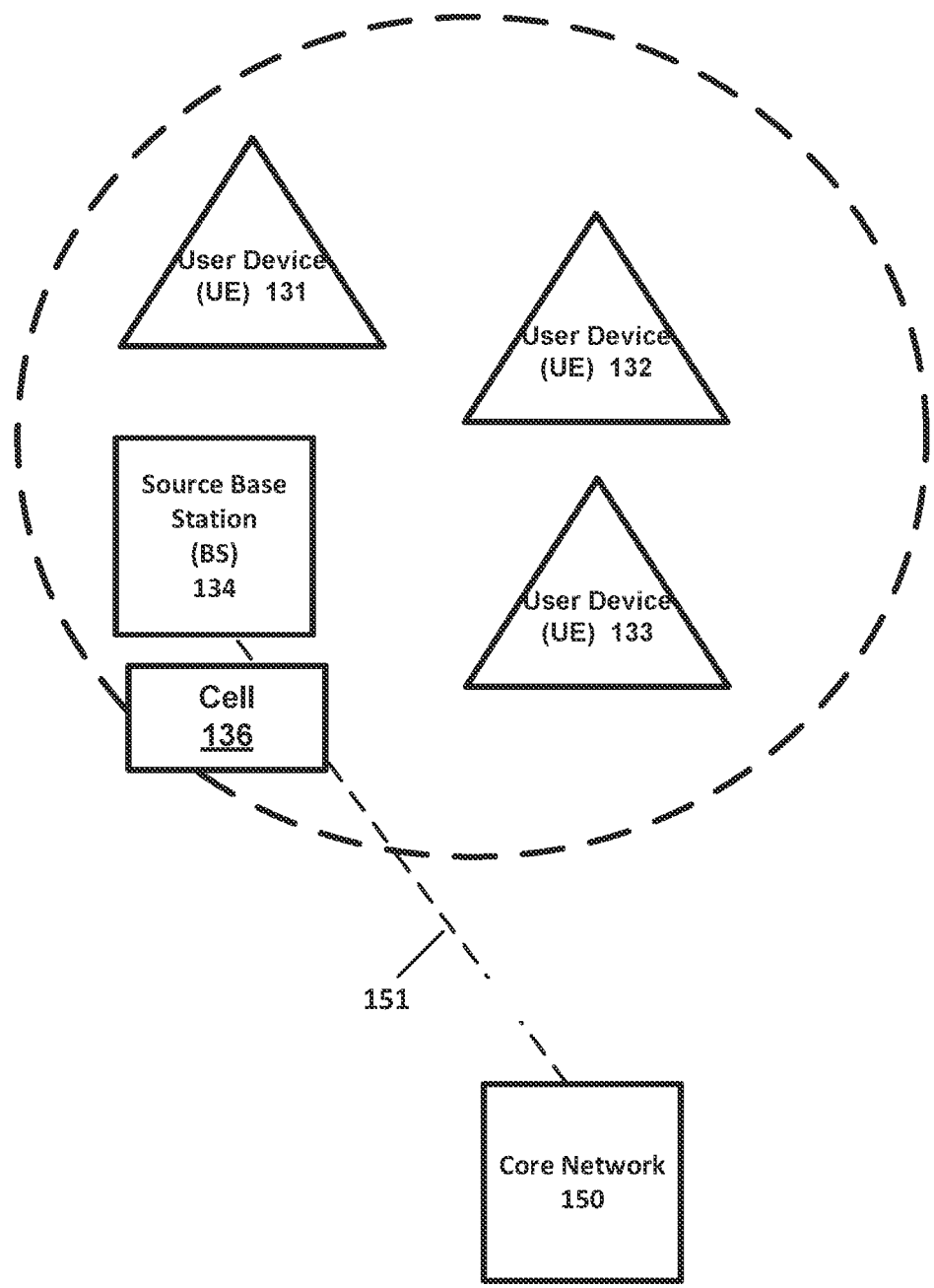
FIG. 1 is a block diagram of a digital communications network according to an example implementation.

FIG. 1 is a block diagram of a digital communications system such as a wireless network 130 according to an example implementation. In the wireless network 130 of FIG. 1, user devices 131, 132, and 133, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) may also be carried out by any node, server or host which may be operably coupled to a transceiver, such as a remote radio head. BS (or AP) 134 provides wireless coverage within a cell 136, including the user devices 131, 132 and 133. Although only three user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/serving cell change of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), time-sensitive communications (TSC), enhanced mobile broadband (eMBB), massive machine type communications (MMTC), vehicle-to-vehicle (V2V), vehicle-to-device, etc. Each of these use cases, or types of UEs, may have its own set of requirements.

Multiple User Subscriber Identity Module (MUSIM) UE's hardware capabilities are shared by the USIMs, and to use the hardware efficiently and economically, the related capabilities need to be dynamically split between the two USIMs. While Release 17 3GPP MUSIM work was for UE's with only Single-Rx/Single-Tx or in best case Dual-Rx/Single-Tx, Release 18 MUSIM work considers UEs with higher capability, i.e. Dual-RX/Dual-TX UE, which will ara capable of maintaining two parallel RRC connection, but with lower capability on each USIM. 3GPP Release 18 will thus provide mechanisms to ease the dynamic split of UE hardware across two USIMs while keeping awareness and control on the network.

A multi-USIM device has two (Dual) or more (Multiple) simultaneous 3GPP/3GPP2 network subscriptions with multiple corresponding International Mobile Subscriber Identities (IMSI) in case of EPS or Subscription Permanent Identifier (SUPI) in case of 5GS each associated with a particular subscription belonging to the same or different Mobile Network Operator (MNO (/Mobile Virtual Network Operator (MVNO)).

In today's phones, the maximum number of supported USIMs is two. However, there has been at least one example of a phone supporting triple-SIM. With the introduction of electronic SIM (e-SIM), it is to be expected that some phones will arrive to the public market with support for more than two USIMs.

Two main types of MUSIM devices are normally referred to depending on the supported simultaneous RRC_states on the USIMs:

Dual SIM Dual Standby (DSDS) or Multi USIM Multi Standby (MUMS): MUSIM devices which are registered with two or more independent subscriber IDs (USIMs) and can be in RRC_IDLE mode on all USIMs. However, it can ONLY be on RRC_CONNECTED mode with a single USIM at a given time.

Dual SIM Dual Active or Multi USIM Multi Active (MUMA): MUSIM devices which are registered with two or more independent subscriber IDs (USIMs) and can be in RRC_IDLE mode on all USIMs. And the device can maintain RRC_CONNECTED mode activities on all USIMs.

Furthermore, the UE's behaviour with respect to the simultaneous handling of multiple USIMs may depend on the UE's capabilities related to concurrent independent RX and/or TX operations as follows:

SingleRx/SingleTx: The UE is only capable of receiving traffic from one network and and/or transmitting traffic to one network at a time.

DualRx/SingleTx: The UE is capable of simultaneously receiving traffic from two networks but is capable of transmitting to only one network at a time.

DualRx/DualTx: The UE is capable of simultaneously receiving and/or transmitting to/from two networks.

A dualRX UE is expected to perform simultaneous RX activities on both its USIMs, e.g. perform reception on its USIM in RRC_IDLE/RRC_INACTIVE while maintaining RRC connection in another USIM or perform independent RRC_IDLE/RRC_INACTIVE operations concurrently on more than one USIM.

However, a dualRX MUSIM UE may still act as a singleRX UE for some specific band/frequency/bandwidth combinations due to (non-limiting) reasons as follows.

Depending on the RF HW design not all RX and TX chains cover the full range of FR1 (LB, MB, HB, and UHB) and FR2 and support of MIMO.

Depending on the RF HW design Front-end components are shared for carriers in same band-group.

Specific band combinations may not be possible due to in-device interference from the generated intermodulation.

Figure 2:
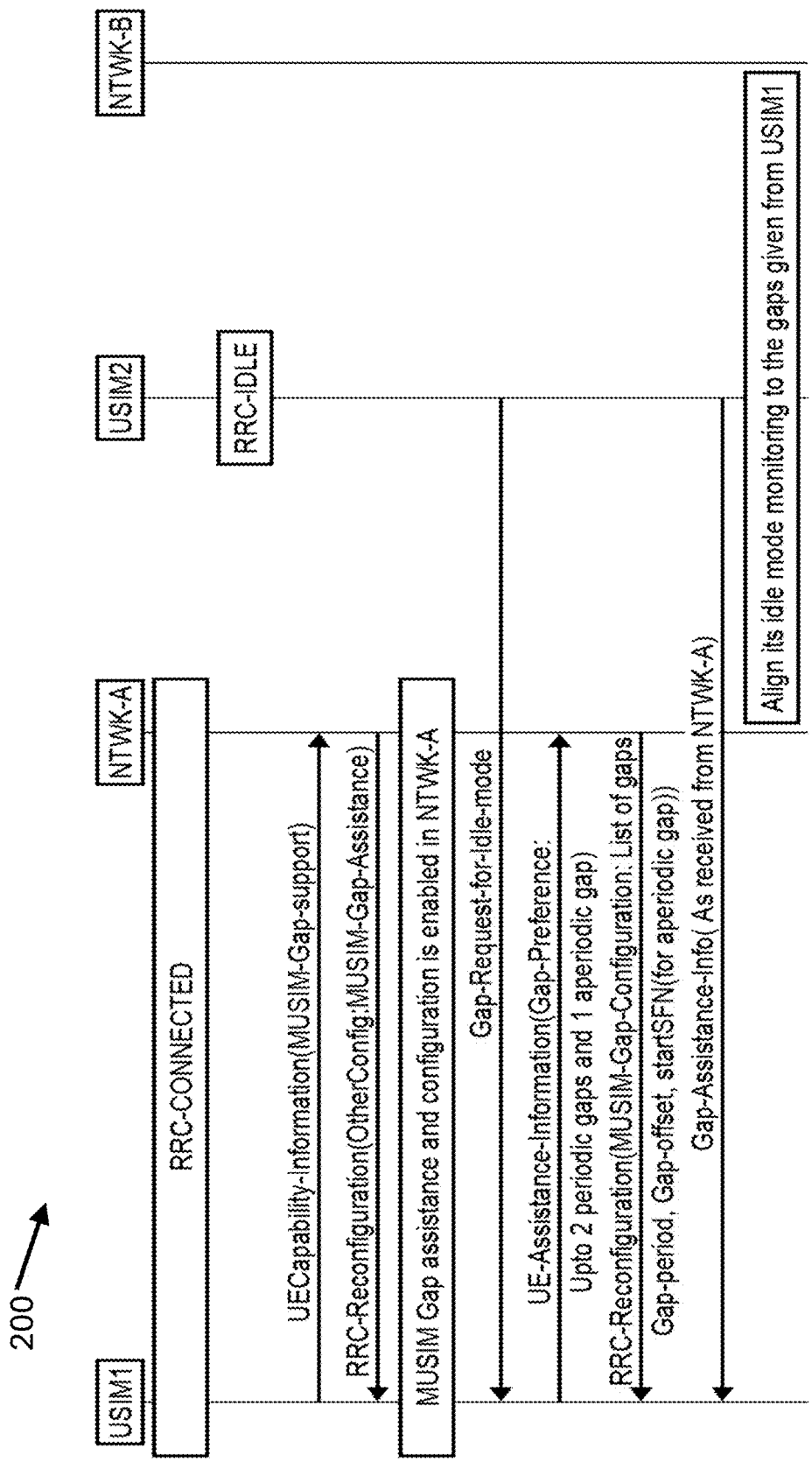
FIG. 2 is a sequence diagram illustrating a RRC signaling procedure for configuring gaps in a first network for idle mode operations at a second network, according to an example implementation.

For definition of MUSIM operation, the UE is assumed to be connected state in NTWK-A and IDLE/INACTIVE mode in NTWK-B. RRC signalling procedure for configuring the gaps in NTWK-A for idle mode operations at NTWK-B such as paging reception and idle mode RRM measurements is given in FIG. 2.

In Rel-17, for periodic activities such as paging monitoring and idle mode RRM measurements 3 gaps can be configured. One aperiodic gap can be configured for gap that is needed for single aperiodic activities such as on-demand system information or cell-reselection.

A MUSIM UE capable of Dual RX/DualTX will assign its RX and TX resources to different NTWK operations to allow simultaneous connections in both networks. If the UE is operating in dual connectivity in one NTWK (NTWK-A), It needs both RX and TX chains in dual connectivity, thus, it may need to release the SCG (secondary cell group) to allow RRC connection setup in other network (NTWK-B). If SCG is released in NTWK-A for MUSIM operation in NTWK-B, at the end of RRC connection in NTWK-B, UE should start SCG addition procedure starting from measurement report and SCG configurations. This will lead to a delay in dual connectivity setup at NTWK-A.

The problem scenario is explained below assuming use of existing solutions to enable simultaneous RRC connections for both networks. The steps involved are the following.

1. UE is in dual connectivity at NTWK-A.
2. UE wants to setup RRC connection in NTWK-B.
3. UE sends UE Assistance Information to release SCG (or any cell-group) at NTWK-A.
4. NTWK-A releases the cell-group.
5. UE starts RRC connection setup procedure at NTWK-B.
6. At the later release of RRC connection at NTWK-B, UE indicate UAI for availability of resource for SCG in NTWK-A.
7. NTWK-A may start procedure for SCG addition, i.e. measurement configuration, reception of measurements from the UE and evaluation, SN/SCG preparation, and triggering RRCReconfiguration for SCG addition.

In the above procedures, there will be significant delay in moving back to dual connectivity due to addition signalling for step 6 and 7 for SCG addition. To enable reasonable UE battery consumption while having possibility for SCG activation, SCG in deactivated state is introduced. However, there is still some UE required activities in this state, which may not be possible when the UE is operating in MUSIM.

In contrast to the above-described conventional MUSIM dual TX/dual RX operations which may have significant delays, improved techniques of MUSIM dual TX/dual RX signaling include providing information by a UE connected to a secondary node within a first network having a secondary cell group in a deactivated state to a second network to which the UE is connected, the information indicating that the UE is to be connected to a secondary cell group of a secondary node in the deactivated state. Specifically, the UE may send to the second network a first gap request requesting a first set of schedule gaps for performing measurements relating to the secondary cell group of the first network, the secondary cell group being in the deactivated state. The UE may then add a connection of a second cell group of the second network to enter the deactivated state for the second cell group of the second network. Afterward, the UE may then send to the first network a second gap request requesting a second set of schedule gaps for performing measurements relating to the second cell group of the second network, the second cell group being in the deactivated state.

Advantageously, the improved techniques of MUSIM dual TX/dual RX signaling avoid the delays associated with adding a new connection to the secondary cell group to the second network.

The improved techniques described herein are centered around the following use case.

The MUSIM UE is in RRC_CONNECTED with dual connectivity in a first network, NTWK-A.

The UE instance for a second network NTWK-B needs to transition to RRC_CONNECTED in NTWK-B. Accordingly, the UE should release one RX/TX chain for this connection. The MUSIM UE provides UE assistance information (UAI) to NTWK-A on its capability limitation regarding maintaining active dual connectivity, i.e. provides its preference to release the SCG to enable a transition to RRC_CONNECTED in NTWK-B.

NTWK-A may release SCG with suspend configuration, i.e. move SCG to the deactivated state.

The UE establishes the RRC connection in NTWK-B. The UE may indicate the capability limitation that SCG deactivated state is possible.

NTWK-B may trigger measurements for Dual connectivity. It is assumed that NTWK-B is aware of UE's capability limitation with respect to active dual connectivity (have received UAI on UE's capability limitation). NTWK-B adds the SCG in deactivated state due to the UE's reported dual connectivity (DC) capability limitation.

At this stage, two parallel RRC connections with deactivated-SCG are active for some time and require gaps (on either of the two RRC connections) to perform measurements corresponding to SCG in deactivated state on both SCGs.

Upon the release of deactivated-SCG in any NTWK, the other NTWK should be updated to release some gaps depending on whether the configured gaps by that NW are impacted.

Upon the release of RRC connection at any NTWK, the other NTWK may resume dual connectivity with SCG-Activation.

The improved techniques include the following.

Maintaining RRC connection with deactivated-SCG in both NTWK-A and NTWK-B with modified gap management procedure to enable downlink reception tasks associated with two deactivated-SCG.

A UAI to request a special set of schedule gaps with gap pattern for deactivated-SCG measurements/monitoring (RRM as well as RLM/BFD) of NTWK-A to NTWK-B after RRC connection setup at NTWK-B.

A UAI to indicate to NTWK (A or B) that 'second receiver not available for deactivated-SCG operations' depending on the receiver sharing situation for other NTWK or for energy saving purpose.

The same UAI indicating that the UE supports deactivated-SCG-monitoring on the same receiver of MCG using an implicit schedule gap based on the SCG configuration.

A network activating implicit schedule gap to UE for deactivated-SCG for measurement/monitoring (RRM as well as RLM/BFD) of its own SCG via the same receiver. UE may deduce the gap pattern based on its own configuration of deactivated SCG configuration.

The network may configure relaxed RLM/BFD measurements for the above situation to reduce the impact of frequency gaps for current scheduling.

This may be allowed beyond the conditions for (normal) RLM/BFD measurement relaxation criteria for cases where MUSIM gap is needed to avoid high impact in RRC connection due to frequency MUSIM gaps.

Figure 3:
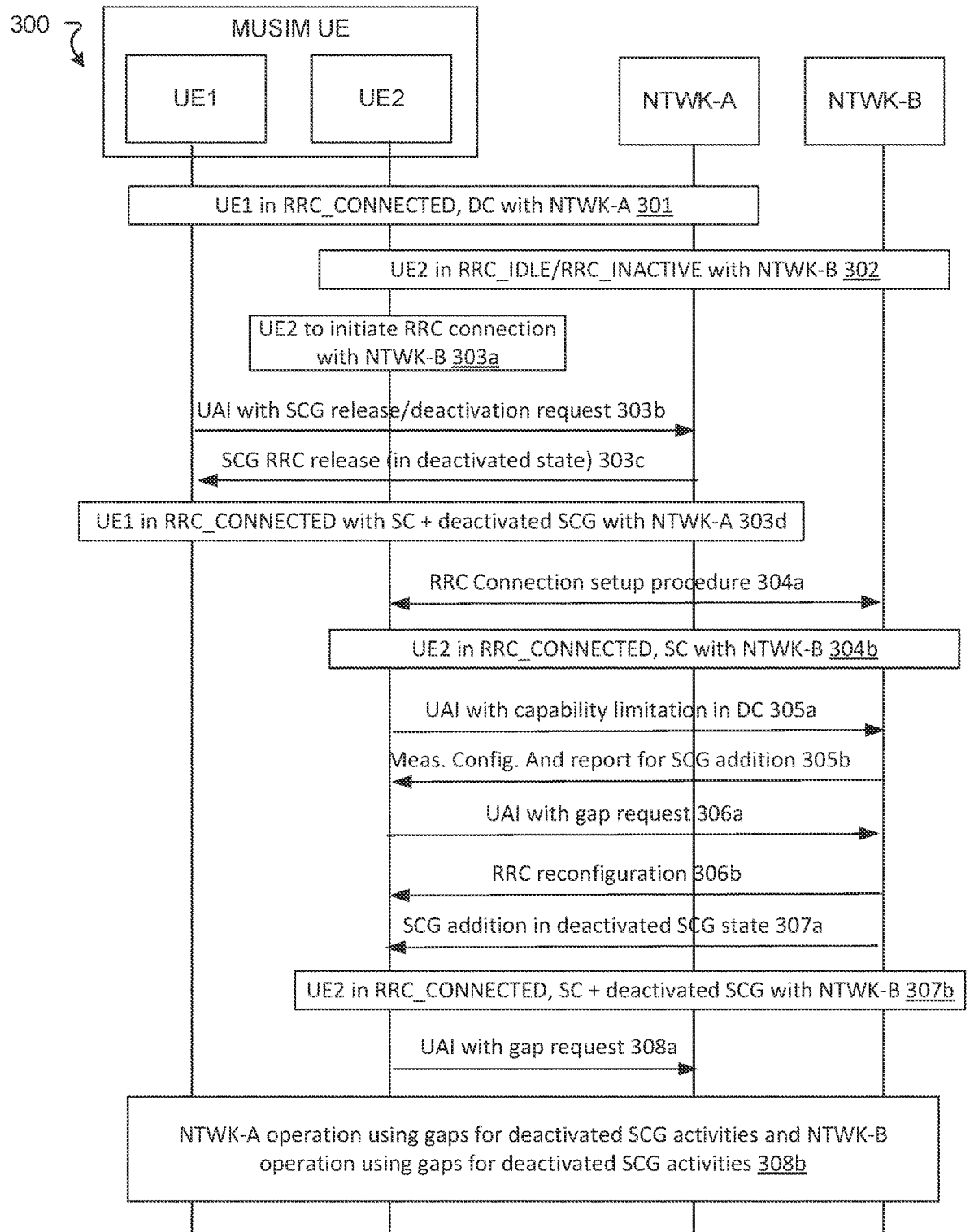
FIG. 3 is a sequence diagram illustrating a messaging signaling sequence of the improved dual-RX/dual-TX MUSIM operation, according to an example implementation.

FIG. 3 is a sequence diagram illustrating a messaging signaling sequence 300 of the improved dual-RX/dual-TX MUSIM operation. Please note that to ease the understanding the MUSIM UE is drawn with two internal instances, UE1 and UE2, each referring to the communication to NW-A and NW-B, respectively.

At 301, the MUSIM UE is in RRC_CONNECTED with Dual connectivity in NTWK-A.

At 302, the MUSIM UE is in RRC_IDLE or RRC_INACTIVE in NTWK-B.

At 303*a*, it is intended that the UE2 instance in MUSIM UE set up RRC connection in NTWK-B.

At 303*b*, the UE1 instance informs NTWK-A about its preference to release SCG.

At 303*c*, the UE1 instance receives RRC release for SCG in deactivated state. At this stage (303*d*) UE is in RRC_CONNECTED state in NTWK-A with an SCG in deactivated state.

At 304*a*, the UE performs RRC connection establishment procedure with NTWK-B.

At 304*b*, after 304*a*, the UE is in RRC_CONNECTED state with single connectivity at NTWK-B.

At 305*a*, the UE transmits a UAI to NTWK-B indicating its DC limitation to support of SCG only in deactivated state.

At 305*b*, as an option, the UE may add this limitation indication to its measurement reports based on configured measurements to NTWK-B which may be used for NTWK-B's decision on SCG-addition.

At 306*a*, the UE may request MUSIM gaps in NTWK-B to perform measurements required for the SCG in deactivated state in NTWK-A. The gap pattern is calculated at UE based on the RS signals related to the measurements (e.g. RLM and BFD). In some implementations, based on UE implementation, the UE may ask for these gaps from NTWK-A itself.

At 306*b*, the UE receives a RRC Reconfiguration from NTWK-B with a schedule gap configuration.

At 307*a*, NTWK-B may add an SCG in deactivated state based on information from UE in 305*a* or 305*b*.

At 307*b*, the UE is also in RRC_CONNECTED state in NTWK-B with an SCG in deactivated state.

At 308*a*, the UE transmits a UAI for request of new gap pattern to NTWK-A. The gap pattern is needed to share the receiver with deactivated-SCG of NTWK-B for measurements (e.g. RLM/BFD) activities, similar to 305*a,b*. In some implementations, the UE requests these gaps from NTWK-B itself.

At 308*b*, NTWK-A and NTWK-B operation with an active connection along with an SCG deactivated by each NTWK is now on-going with need for MUSIM gaps to perform SCG deactivated state operations on each USIM.

In some implementations, the UE combines/merges the requested measurement gaps for SCG deactivated in NTWK-A and SCG deactivated in NTWK-B.

In some implementations, based on UE implementation, the UE may decide to request these gaps, i.e. measurement gaps for SCG deactivated in NTWK-A and SCG deactivated in NTWK-B, from one of the NTWKs, e.g. NTWK-A.

In some implementations, based on UE implementation, the UE may decide to request these gaps from both NTWK-A and NTWK-B, e.g. requesting MUSIM gap from NTWK-A for SCG deactivated measurements in UE1 and requesting MUSIM gap from NTWK-B for SCG deactivated measurements in UE2.

On release of deactivated-SCG in any NTWK, the other NTWK should be updated to release some gaps depending on whether the configured gaps by that NW are impacted, and on release of RRC connection at any NTWK, the other NTWK may resume dual connectivity with SCG-Activation. This also indicates the possibility of activation and deactivation for MUSIM purpose.

Figure 4A:
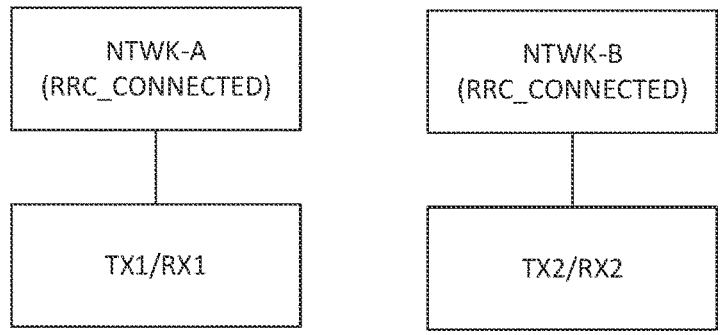
FIG. 4A is a diagram illustrating a dual-SIM, dual active scenario for single connectivity, according to an example implementation.

FIG. 4A is a diagram illustrating a dual-SIM, dual active scenario 400 for single connectivity. As shown in FIG. 4A, each of NTWK-A and NTWK-B has an active RRC connection to a respective TX/RX.

Figure 4B:
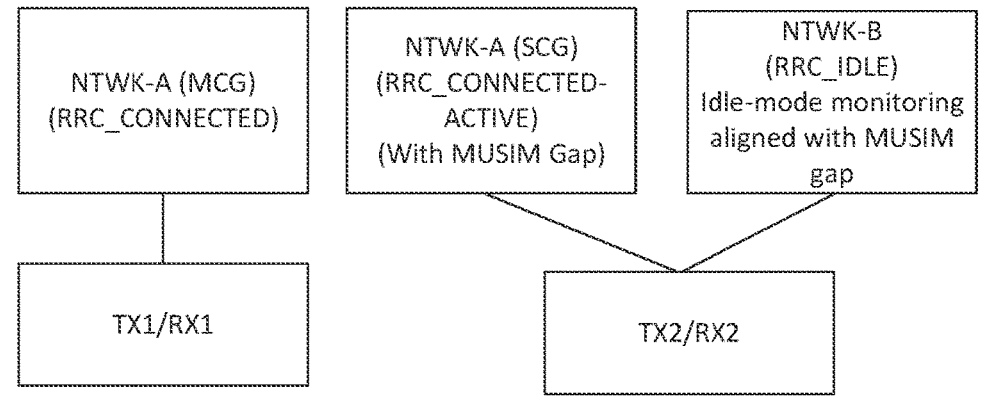
FIG. 4B is a diagram illustrating a dual-SIM, dual standby scenario for dual connectivity, according to an example implementation.

FIG. 4B is a diagram illustrating a dual-SIM, dual standby scenario 430 for dual connectivity, according to an example implementation. As shown in FIG. 4B, NTWK-A is in an active RRC_CONNECTED state with TX1/RX1 and TX2/RX2 (with a schedule gap) while NTWK-B is in an RRC-IDLE state with TX2/RX2. The idle-mode monitoring is aligned with the schedule gap for measurements.

Figure 4C:
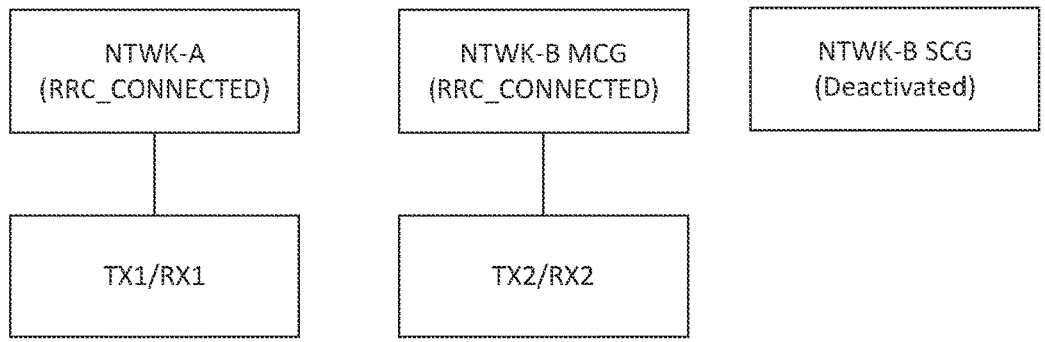
FIG. 4C is a diagram illustrating a dual-SIM, dual active scenario with dual TX/dual RX, according to an example implementation.

FIG. 4C is a diagram illustrating a dual-SIM, dual active scenario 460 with dual TX/dual RX, according to an example implementation. As shown in FIG. 4C, NTWK-A is in an active DC RRC_CONNECTED state with TX1/RX1 while NTWK-B is in an active SC RRC_CONNECTED state with a MCG and with TX2/RX2, but also in a deactivated state with a SCG.

Figure 5:
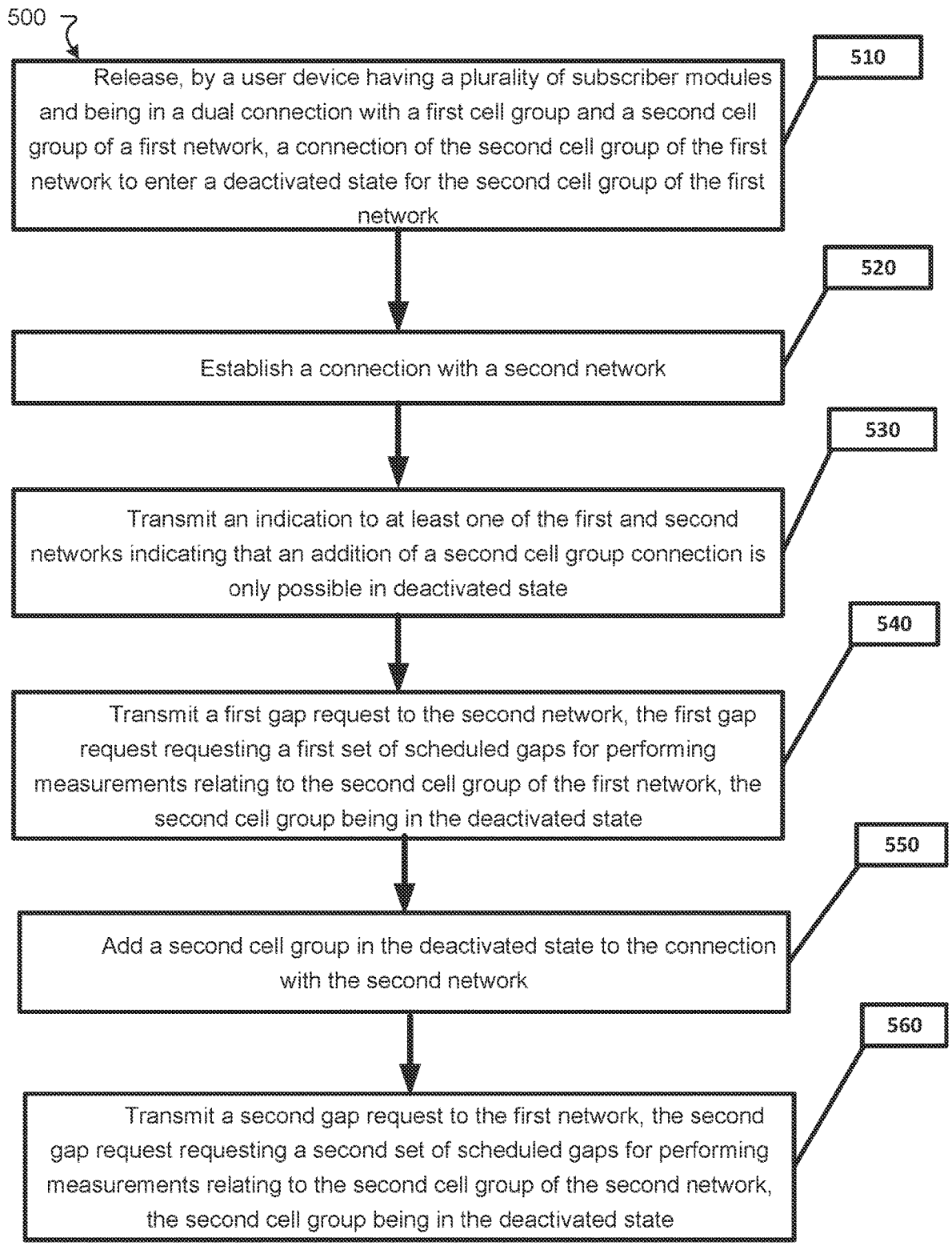
FIG. 5 is a flow chart illustrating an improved process of messaging in a dual-RX/dual-TX MUSIM operation, according to an example implementation.

Example 1-1: FIG. 5 is a flow chart illustrating a process 500 of operating a MUSIM deactivated SCG in dual RX/TX. Operation 510 includes releasing, by a user device having a plurality of subscriber modules and being in a dual connection with a first cell group and a second cell group of a first network, a connection of a second cell group of the first network to enter a deactivated state for the second cell group of the first network. Operation 520 includes establishing a connection with a second network. Operation 530 includes transmitting an indication to at least one of the first and second networks indicating that an addition of a second cell group connection is only possible in deactivated state. Operation 540 includes transmitting a first gap request to the second network, the first gap request requesting a first set of scheduled gaps for performing measurements relating to the second cell group of the first network, the second cell group being in the deactivated state. Operation 550 includes adding a second cell group in the deactivated state to the connection with the second network. Operation 560 includes transmitting a second gap request to the first network, the second gap request requesting a second set of scheduled gaps for performing measurements relating to the second cell group of the second network, the second cell group being in the deactivated state.

Example 1-2: According to an example implementation of example 1-1, wherein the first cell group is a master cell group and the second cell group is a secondary cell group.

Example 1-3: According to an example implementation of example 1-2, wherein the second cell group of the first network is one of the master cell group or the secondary cell group.

Example 1-4: According to an example implementation of examples 1-2 to 1-3, wherein the second cell group of the second network is one of a master cell group or a secondary cell group.

Example 1-5: According to an example implementation of examples 1-2 to 1-4, wherein the first gap request requesting a first set of scheduled gaps for performing measurements relating to the second cell group of the first network in deactivated state is requested from the first network.

Example 1-6: According to an example implementation of examples 1-2 to 1-5, wherein the second gap request requesting a second set of scheduled gaps for performing measurements relating to the second cell group of the second network in deactivated state is requested from the second network.

Example 1-7: According to an example implementation of examples 1-1 to 1-6, wherein the indication is included in a reporting of the measurements relating to the second cell group of the first network or the second cell group of the second network.

Example 1-8: According to an example implementation of examples 1-1 to 1-7, wherein the first set of scheduled gaps is associated with a first subscriber module of the plurality of subscriber modules, and the second set of scheduled gaps is associated with a second subscriber module of the plurality of subscriber modules.

Example 1-9: According to an example implementation of examples 1-1 to 1-8, wherein the requested first set of gaps and second set of gaps are associated with radio link monitoring measurements on the second cell group in the deactivated state in the first network and radio link monitoring measurements on the second cell group in the deactivated state in the second network.

Example 1-10: According to an example implementation of example 1-6, further comprising receiving, from the first network, a notification that the first subscriber module is in the deactivated state with regard to a secondary cell group of the first network, wherein the connection with the second network is established after receiving the notification.

Example 1-11: According to an example implementation of examples 1-6 to 1-7, further comprising transmitting, to the second network, a notification indicating that the second subscriber module has a capability limitation with respect to a dual connection with the second network.

Example 1-12: According to an example implementation of examples 1-1 to 1-11, wherein the second set of scheduled gaps is based on the first set of scheduled gaps.

Example 1-13: An apparatus comprising means for performing a method of any of examples 1-1 to 1-12.

Example 1-14: A computer program product including a non-transitory computer-readable storage medium and storing executable code that, when executed by at least one data processing apparatus, is configured to cause the at least one data processing apparatus to perform a method of any of examples 1-1 to 1-12.

List of Example Abbreviations

| | |
|---|---|
| CA: | Carrier Aggregation |
| CC: | Component Carrier |
| DC | Dual Connectivity |
| DSDA: | Dual SIM Dual Standby |
| DSDS: | Dual SIM Dual Active |
| IMSI: | International Mobile Subscriber Identities (IMSI |
| MNO: | Mobile Network Operator |
| MVNO: | Mobile Virtual Network Operator |
| MUSIM: | Multiple USIM |
| NW: | Network |
| RRC | Radio Resource Control |
| SCG | Secondary Carrier Group |
| UAI | UEAssistanceInformation |

Figure 6:
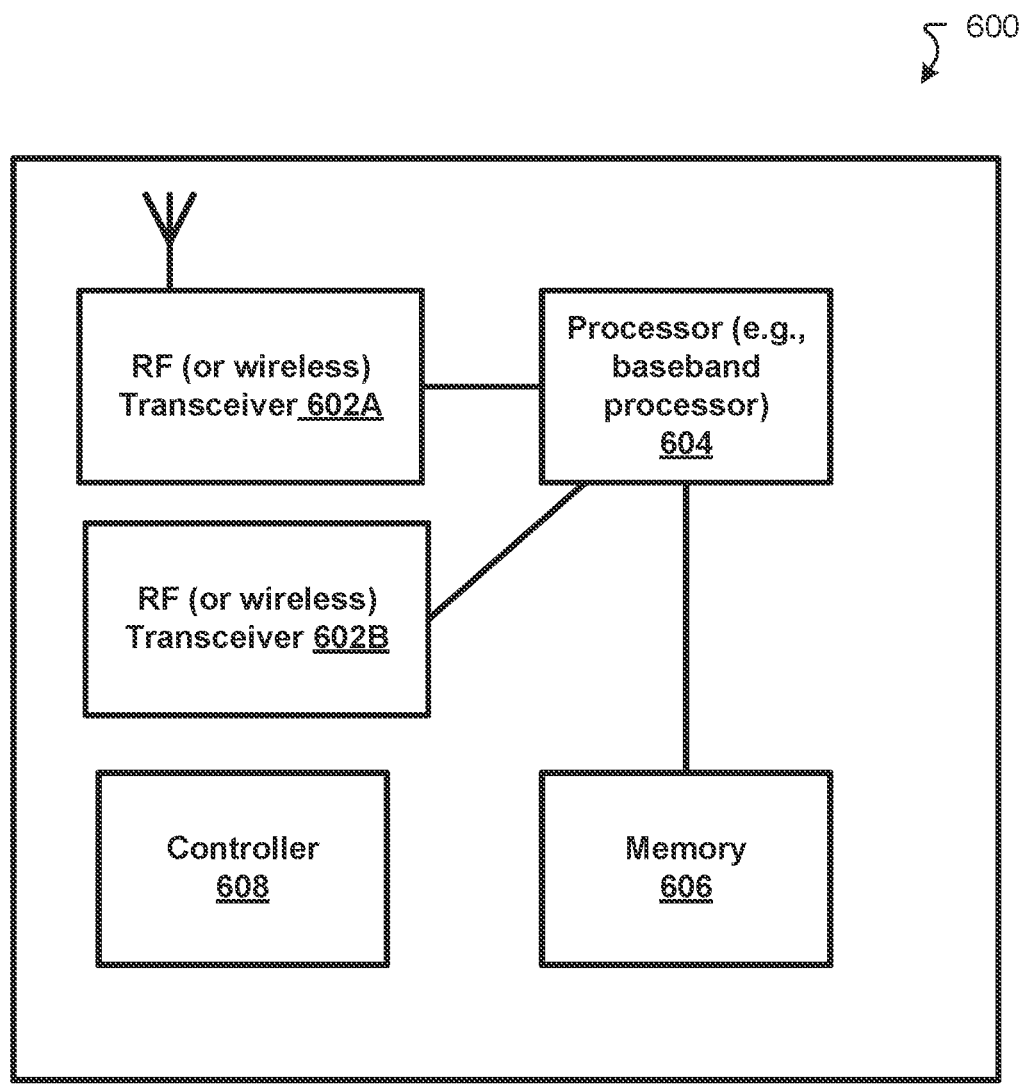
FIG. 6 is a block diagram of a node or wireless station (e.g., base station/access point, relay node, or mobile station/user device) according to an example implementation.

FIG. 6 is a block diagram of a wireless station (e.g., AP, BS, e/gNB, NB-IoT UE, UE or user device) 600 according to an example implementation. The wireless station 600 may include, for example, one or multiple RF (radio frequency) or wireless transceivers 602A, 602B, where each wireless transceiver includes a transmitter to transmit signals (or data) and a receiver to receive signals (or data). The wireless station also includes a processor or control unit/entity (controller) 604 to execute instructions or software and control transmission and receptions of signals, and a memory 606 to store data and/or instructions.

Processor 604 may also make decisions or determinations, generate slots, subframes, packets or messages for transmission, decode received slots, subframes, packets or messages for further processing, and other tasks or functions described herein. Processor 604, which may be a baseband processor, for example, may generate messages, packets, frames or other signals for transmission via wireless transceiver 602 (602A or 602B). Processor 604 may control transmission of signals or messages over a wireless network, and may control the reception of signals or messages, etc., via a wireless network (e.g., after being down-converted by wireless transceiver 602, for example). Processor 604 may be programmable and capable of executing software or other instructions stored in memory or on other computer media to perform the various tasks and functions described above, such as one or more of the tasks or methods described above. Processor 604 may be (or may include), for example, hardware, programmable logic, a programmable processor that executes software or firmware, and/or any combination of these. Using other terminology, processor 604 and transceiver 602 (602A or 602B) together may be considered as a wireless transmitter/receiver system, for example.

In addition, referring to FIG. 6, a controller (or processor) 608 may execute software and instructions, and may provide overall control for the station 600, and may provide control for other systems not shown in FIG. 6 such as controlling input/output devices (e.g., display, keypad), and/or may execute software for one or more applications that may be provided on wireless station 600, such as, for example, an email program, audio/video applications, a word processor, a Voice over IP application, or other application or software.

In addition, a storage medium may be provided that includes stored instructions, which when executed by a controller or processor may result in the processor 604, or other controller or processor, performing one or more of the functions or tasks described above.

According to another example implementation, RF or wireless transceiver(s) 602A/602B may receive signals or data and/or transmit or send signals or data. Processor 604 (and possibly transceivers 602A/602B) may control the RF or wireless transceiver 602A or 602B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G uses multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IoT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall as intended in the various embodiments.

What is claimed is:

1. An apparatus, comprising:
   at least one processor, and
   at least one memory including computer program code;
   the at least one memory and the computer program code configured to cause the apparatus at least to:
   release, by a user device having a plurality of subscriber modules and being in a dual connection with a first cell group and a second cell group of a first network, a connection of the second cell group of the first network to enter a deactivated state for the second cell group of the first network;
   establish a connection with a second network;
   transmit an indication to at least one of the first and second networks indicating that an addition of a second cell group connection is only possible in deactivated state;
   transmit a first gap request to the second network, the first gap request requesting a first set of scheduled gaps for performing measurements relating to the second cell group of the first network, the second cell group being in the deactivated state;
   add a second cell group in the deactivated state to the connection with the second network; and
   transmit a second gap request to the first network, the second gap request requesting a second set of scheduled gaps for performing measurements relating to the second cell group of the second network, the second cell group being in the deactivated state.

2. The apparatus as in claim 1, wherein the first cell group is a master cell group and the second cell group is a secondary cell group.

3. The apparatus as in claim 2, wherein the second cell group of the first network is one of the master cell group or the secondary cell group.

4. The apparatus as in claim 2, wherein the second cell group of the second network is one of a master cell group or a secondary cell group.

5. The apparatus as in claim 1, wherein the first gap request requesting a first set of scheduled gaps for performing measurements relating to the second cell group of the first network in deactivated state is requested from the first network.

6. The apparatus as in claim 1, wherein the second gap request requesting a second set of scheduled gaps for performing measurements relating to the second cell group of the second network in deactivated state is requested from the second network.

7. The apparatus as in claim 1, wherein the indication is included in a reporting of the measurements relating to the second cell group of the first network or the second cell group of the second network.

8. The apparatus as in claim 1, wherein the first set of scheduled gaps is associated with a first subscriber module of the plurality of subscriber modules, and the second set of scheduled gaps is associated with a second subscriber module of the plurality of subscriber modules.

9. The apparatus as in claim 8, wherein the at least one memory and the computer program code are further configured to cause the apparatus at least to:
   receive, from the first network, a notification that the first subscriber module is in the deactivated state with regard to a secondary cell group of the first network,
   wherein the connection with the second network is established after receiving the notification.

10. The apparatus as in claim 1, wherein the requested first set of gaps and second set of gaps are associated with radio link monitoring measurements on the second cell group in the deactivated state in the first network and radio link monitoring measurements on the second cell group in the deactivated state in the second network.

11. The apparatus as in claim 8, wherein the at least one memory and the computer program code are further configured to cause the apparatus at least to:
   transmit, to the second network, a notification indicating that the second subscriber module has a capability limitation with respect to a dual connection with the second network.

12. The apparatus as in claim 1, wherein the second set of scheduled gaps is based on the first set of scheduled gaps.

13. A method, comprising:
   releasing, by a user device having a plurality of subscriber modules and being in a dual connection with a first cell group and a second cell group of a first network, a connection of the second cell group of the first network to enter a deactivated state for the second cell group of the first network;
   establishing a connection with a second network;
   transmitting an indication to at least one of the first and second networks indicating that an addition of a second cell group connection is only possible in deactivated state;
   transmitting a first gap request to the second network, the first gap request requesting a first set of scheduled gaps for performing measurements relating to the second cell group of the first network, the second cell group being in the deactivated state;

adding a second cell group in the deactivated state to the connection with the second network; and transmitting a second gap request to the first network, the second gap request requesting a second set of scheduled gaps for performing measurements relating to the second cell group of the second network, the second cell group being in the deactivated state.

14. The method as in claim 13, wherein the first cell group is a master cell group and the second cell group is a secondary cell group.

15. The method as in claim 14, wherein the second cell group of the first network is one of the master cell group or the secondary cell group.

16. The method as in claim 14, wherein the second cell group of the second network is one of a master cell group or a secondary cell group.

17. The method as in claim 13, wherein the first gap request requesting a first set of scheduled gaps for performing measurements relating to the second cell group of the first network in deactivated state is requested from the first network.

18. The method as in claim 13, wherein the second gap request requesting a second set of scheduled gaps for performing measurements relating to the second cell group of the second network in deactivated state is requested from the second network.

19. The method as in claim 13, wherein the indication is included in a reporting of the measurements relating to the second cell group of the first network or the second cell group of the second network.

20. A computer program product including a non-transitory computer-readable storage medium and storing executable code that, when executed by at least one data processing apparatus, is configured to cause a user device having a plurality of subscriber modules and being in a dual connection with a first cell group and a second cell group of a first network to at least:

release a connection of the second cell group of the first network to enter a deactivated state for the second cell group of the first network;

establishing a connection with a second network;

transmit an indication to at least one of the first and second networks indicating that an addition of a second cell group connection is only possible in deactivated state;

transmit a first gap request to the second network, the first gap request requesting a first set of scheduled gaps for performing measurements relating to the second cell group of the first network, the second cell group being in the deactivated state;

add a second cell group in the deactivated state to the connection with the second network; and transmit a second gap request to the first network, the second gap request requesting a second set of scheduled gaps for performing measurements relating to the second cell group of the second network, the second cell group being in the deactivated state.

* * * * *